Sept. 16, 1941. F. R. WEHMEIER 2,256,302
BRAKE CONTROL
Filed Jan. 26, 1940 2 Sheets-Sheet 2
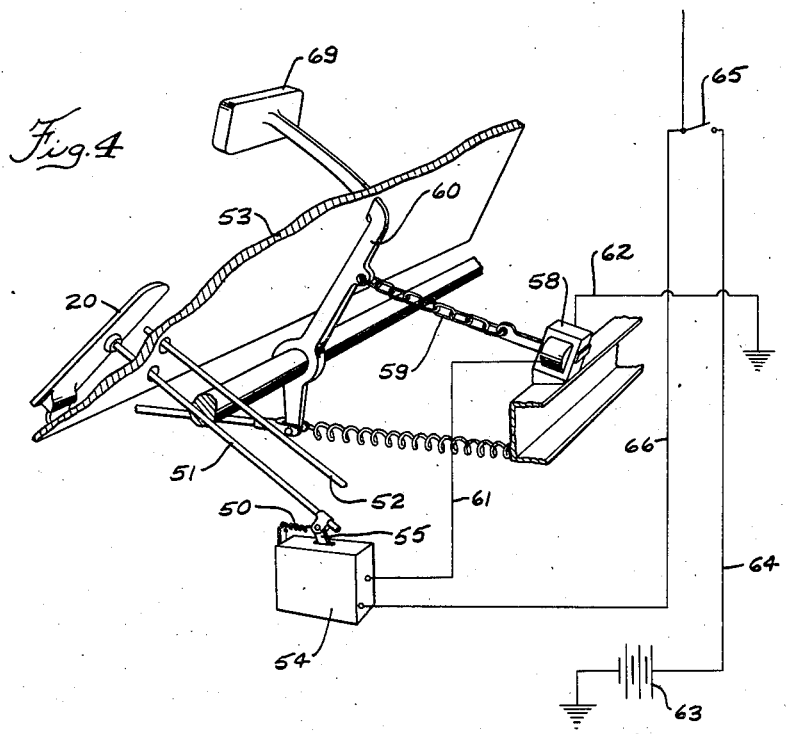
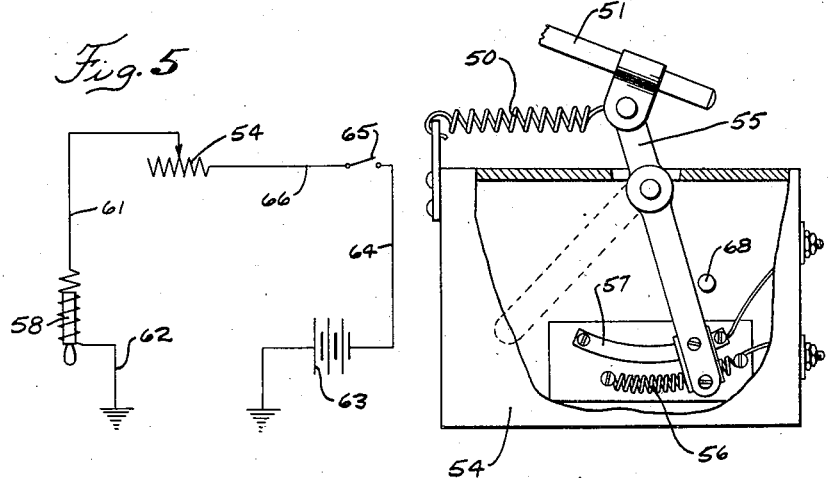
INVENTOR
FRED R. WEHMEIER,
By Minturn & Minturn
ATTORNEYS Patented Sept. 16, 1941

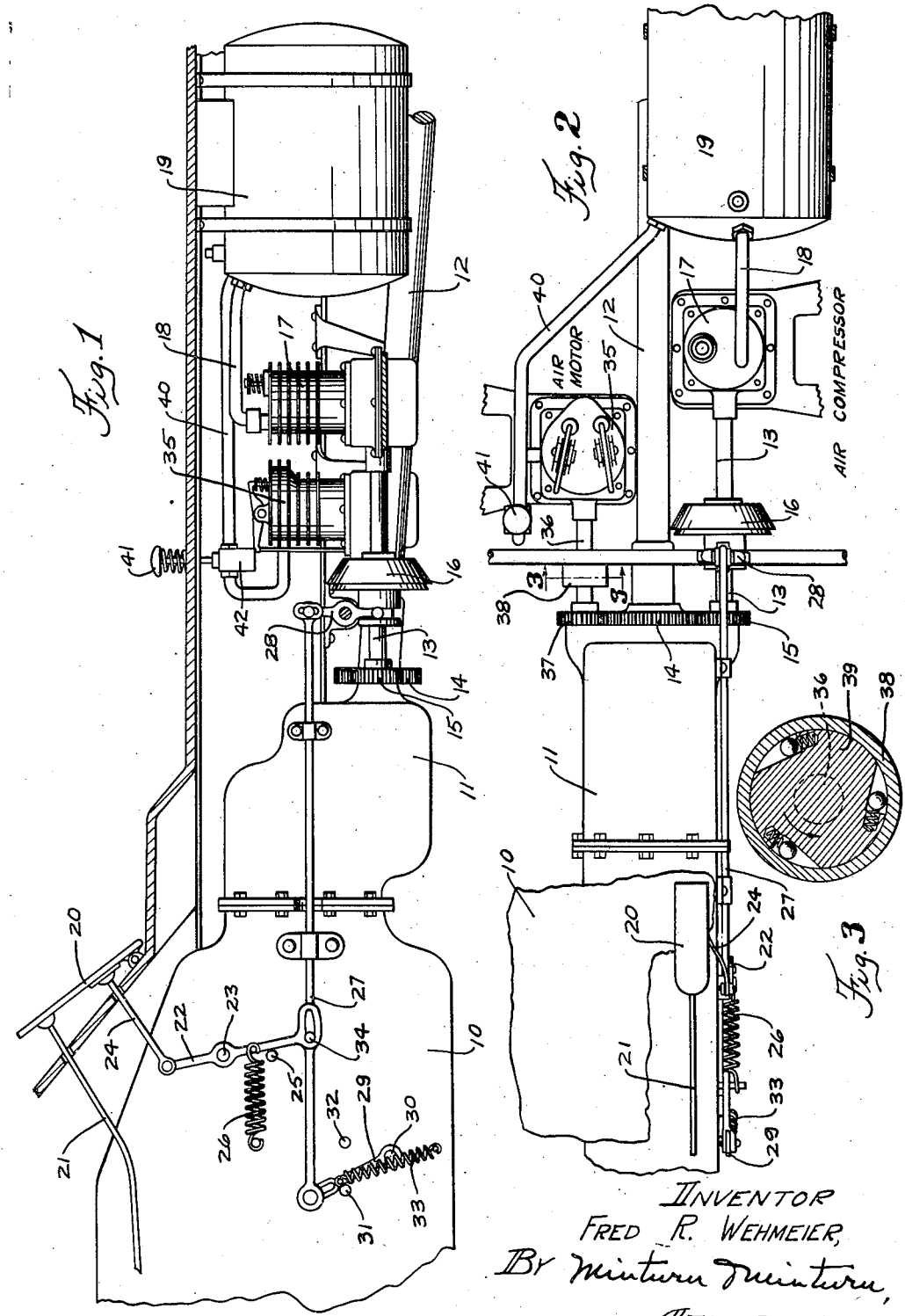

2,256,302

UNITED STATES PATENT OFFICE 2,256,302

BRAKE CONTROL

Fred R. Wehmeier, Indianapolis, Ind.

Application January 26, 1940, Serial No. 315,675

3 Claims. (Cl. 192—3)

This invention relates to means automatically applying brakes in a moving vehicle including automobiles, or vehicles traveling upon tracks and is particularly directed to the application of the brakes by reverse travel of a speed control member, that is the travel of that member when the speed of the vehicle is being decreased, or the travel of that member back to its normal initial starting position. In the automobile, this speed control member would be the usual foot pedal that controls the valve in the carburetor, in which case the braking action would occur during the up-stroke of that pedal as the foot of the operator is lifted.

As indicated hereinafter, the invention may take a number of forms as to final braking application and specifically may be applied to mechanically or electrically operating brake applying or speed retarding means.

The invention in one particular form hereinafter shown and described, embraces means for not only retarding the speed of the vehicle upon the reverse travel of the speed control member but also the storing up of energy which may be afterwards applied in driving the vehicle if so desired. In any event, it is the intention to apply the present invention to vehicles without replacing the existing brake system but on the contrary, to work in conjunction therewith, and be particularly useful in vehicles employing "free wheeling" drives wherein the usual power plant exerts no braking effect when the power is reduced or shut off.

These and other objects and advantages of the invention will become apparent to those versed in the art in the following description of the invention as illustrated more or less diagrammatically in the accompanying drawings, in which Fig. 1 is a side elevation of a structure incorporating the invention;

Fig. 2, a top plan view;

Fig. 3, a detail in section on the line 3—3 in Fig. 2;

Fig. 4, a diagrammatic view in perspective of a modified form of the invention;

Fig. 5, a wiring diagram of the electrical circuit employed in that modified form; and Fig. 6, a detail on an enlarged scale in partial section of the brake control unit employed in that modified form.

Like characters of reference indicate like parts throughout the several views in the drawings.

Referring first to that form of the invention as shown in Figs. 1-3, the invention is illustrated in one example as being applied to an automobile wherein the usual engine 10 through a transmission 11 drives a propeller shaft 12 connecting in the usual and well known manner with the rear axle (not shown) for driving the rear wheels of the vehicle.

A jack shaft 13 is driven from the propeller shaft 12 by any suitable means such as through the spur gears 14 (fixed to the propeller shaft) and 15 (fixed to the jack shaft 13) so that normally the jack shaft 13 is turning at all times when the propeller shaft 12 is turning.

Interposed, however, in the jack shaft 13 is a clutch 16 of any suitable type, the details of which do not enter into the present invention. It is sufficient for the clutch 16 to interrupt the drive of the rear part of the jack shaft 13 from the forward part of the jack shaft 13, between which two parts the clutch 16 is presented. The rear portion of the jack shaft 13 is connected to and operates to drive a fluid compressor 17, the compressor in the present instance being designed and operated to compress air taken from the atmosphere. The discharge from the compressor 17 is taken through a pipe 18 to a storage tank 19. Thus normally during movement of the vehicle when the shaft 12 is turning, the compressor 17 is operating to store up air under pressure in the tank 19, the compressor, of course, being designed in the usual and well known manner to "unload" at a predetermined top pressure limit. No claim is made to the specific construction of the compressor itself.

The normal condition of the clutch 16 is that where the two parts of the jack shaft 13 are interconnected so as to be driven as a single unit. A clutch release mechanism is provided to be operated in accordance with one of the primary objects of the invention.

In the present example, the engine 10 is controlled by the usual foot pedal 20 commonly referred to as the accelerator pedal. This pedal 20 has the usual connecting rod 21 running to the linkage controlling the carburetor (not shown) of the engine 10. Now in addition to that standard construction, I provide a linkage between the pedal 20 and the clutch 16 to operate in such a manner that when the pedal is depressed, initial travel of the pedal will start releasing the clutch 16 and completely release it by the end of a predetermined amount of that initial pedal travel, and subsequent travel of the pedal 20 downwardly or toward the floor board of the vehicle will continue to hold the clutch 16 in its released position, and further, upon release of the pedal 20 or upward travel thereof, the clutch 16 will remain released until the pedal comes within that range of predetermined initial travel whereupon the clutch 16 will reengage and remain engaged as the pedal 20 continues its upward travel to its upper limit.

Of course, while the clutch 16 is engaged and the vehicle is still moving, irrespective of arrangement of gears in the transmission 11, the vehicle through the shaft 12 will cause the compressor 17 to operate and thus put a load on the shaft tending to slow it down, the compressor 17 normally working below its top pressure limit during this performance.

In the particular form herein shown, one particular linkage arrangement between the pedal 20 and the clutch 16 consists of a rocker 22 pivoted on the pin 23 to have its upper end above the pivot interconnected with the pedal 20 by the link 24. The lower arm of the rocker 22 is normally pulled against a stop post 25 by a pedal return spring 26. Also the lower arm of the rocker 22 engages with a rod 27 which extends rearwardly to the clutch control fork 28. In the arrangement indicated, Fig. 1, rearward travel of the rod 27 will serve to rock the fork 28 to the clutch release position. In order to maintain the clutch control fork 28 in either the clutch engaged or clutch disengaged positions, a lever 29 is hinged on a pivot 30 to rock between two stops 31 and 32. The upper end of the lever 29 is connected with the rod 27 and a spring 33 is fixed by one end below the pivot 30 and by its other end to the lever 29 above the pivot 30 in such manner that as the rod 27 is shifted longitudinally, the spring 33 when carried across the axis of the pivot 30 will tend to shift the rod 27 onto either position as will be limited by the positions of the stops 31 and 32. In this connection it is to be noted that the lower end of the rocker 22 has a lost motion connection with the rod 27, herein shown as by means of a pin 34 extending from the rod 27 through a slot in a foot on the lower end of the rocker 22. The pin 34 will be at the forward end of travel of the slot in that rocker foot when the lever 29 is against the forward stop 31 and the pedal 20 is in its uppermost position of travel.

As suggested by the foregoing description, the load applied by the operation of the compressor 17 operates as a brake equalizing between the rear wheels of the vehicle through the propeller shaft 12 and in most cases will be sufficient to keep the vehicle within control. In case of emergency stops on the other hand, the regular foot brake will be used to apply the brakes on all four wheels in addition to the braking effect exerted through the compressor load on the two rear wheels. There, of course, will be no sudden action but the action will be gradual as the clutch 16 engages and the compressor load is applied. As above suggested, this action is particularly of advantage where it is desirable to employ the usual "free wheeling" drive between the engine and the propeller shaft 12.

In order to conserve the energy stored up in the compressed air in the tank 19, the invention is carried further in that an air motor 35 is provided to be connected through a jack shaft 36 and a spur gear 37 with the propeller gear 14. The shaft 36 is broken into two parts to receive therebetween an overrunning clutch 38 of any suitable style, one particular form being that indicated in Fig. 3, wherein the ball-wedge type is shown. The clutch 38 is so designed that when the shaft 12 is normally turning under a power load, the air motor remains stationary and the clutch element 38 revolves in a free direction (counterclockwise, Fig. 3).

Following the descent of a hill or where unusually quick acceleration is desired, air from the tank 19 may be conveyed through the pipe 40 to the air motor 35 by pushing down on the control button 41 to open the valve 42 in the pipe 40, the valve 42, of course, normally being closed. Thus the air stored in the tank 19 may be utilized at least until its pressure drops below that which would be sufficient to operate the motor 35 in a manner to aid in driving the shaft 12 through the gears 37 and 14.

A primary object of the invention being the automatic application of brakes upon a part at least of the up-stroke of the power control pedal (accelerator in the automobile), it is obvious that other types of brake operation may be employed. An example of one of these other types will now be described. This form is illustrated in Figs. 4–6 wherein the foot pedal 20 is normally held in an upper limit of travel by means of a spring 50 bearing through a rod 51 connected to the pedal. In the particular form herein shown, the pedal 20 has an initial degree of travel before it starts operating the carburetor control which in the present case is had through the rod 52 coming up through the floor board 53 and having its upper end spaced from the under side of the pedal 20 so that the travel of the pedal 20 initially may go through that degree indicated before striking the end of the rod 52, whereupon further depression of the pedal 20 will actuate the rod 52. That is, in the automobile, the engine will not be speeded up until the pedal 20 travels sufficiently far to strike the rod 52 and move it.

In general, this form of the invention as illustrated in Figs. 4–6, comprises means actuated by a small degree of initial travel of the foot pedal to variably increase voltage in an electric circuit upon up-travel of the pedal whereupon that voltage is applied to an electroresponsive device acting in response to that applied voltage to apply the brakes of the vehicle in a gradual manner but nevertheless in a resultant positive manner.

The form of this means illustrated consists of a rheostat, generally designated by the numeral 54, operated by a lever 55 connecting with the rod 51. As illustrated in Fig. 6, a simple form of this rheostat may consist of a length of resistance wire 56 and a contact bar 57 bridged by a conductor carried on the lower end of the arm 55. In the normal up position of the pedal 20, the arm 55 will be in the position as shown by the solid lines in Fig. 6 where the minimum resistance is incorporated in the circuit. The arm 55 is so arranged that it may travel beyond (to the left) the resistance unit 56 so that the circuit is then interrupted at the end of the application of the maximum resistance (minimum voltage).

A magnetic device such as a solenoid 58 is mounted in any suitable location and through a flexible connection such as a chain 59 is connected to a brake operating lever 60 which is normally provided in the vehicle for actuating the standard brake system. In the automobile at present, this system consists of hydraulic means requiring but slight power to move the lever 60 to apply the brakes.

From the conductor 57 in the rheostat 54 is carried a wire 61 to the winding of the solenoid 58 and from the other terminal of that winding leads a wire 62 to the ground or return connection with the usual source of current or storage battery 63. A wire 64 leads from the nongrounded terminal of the battery to a control switch such as the ignition switch 65, and a wire 66 leads from that switch to the resistance 56 in the rheostat 54. With that circuit example in mind, assuming that the ignition switch 65 is closed as it will be during the travel of the vehicle and as long as the engine itself is operating, current is made available at the resistance 56 and the conductor 57 and with the pedal 20 in its normal upper limit of travel as maintained by the spring 50, maximum voltage will be available in the circuit including the winding of the solenoid 58 so that the armature of the solenoid will then be retracted to pull the lever 60 into the brake operated position with the maximum available power to be exerted by the solenoid 58. This is the brake holding position. Then when the vehicle is to be set in motion, the foot pedal 20 will be depressed and during the initial travel of the pedal, the arm 55 will be rocked to gradually decrease the voltage of the current flowing through the solenoid winding 58 until the circuit is interrupted entirely by the travel of the arm 55 beyond its bridging position between the resistance 56 and the conductor 57, this being the position at which the pedal 20 initially strikes the carburetor control rod 52. Thus following that initial travel of the pedal 20, the brakes are completely released in so far as action of the solenoid 58 is concerned. Then, most importantly, the brakes are automatically applied in a gradual manner depending upon rapidity of release of the pedal 20 as it travels from the stop position of the rod 52 back to the upper limit of travel of the pedal 20. This position in the present showing is determined by the stop 68, Fig. 6, against which the arm 55 strikes by reason of the pull of the spring 50.

Of course the usual pedal 69 may still be operated manually since that pedal 69, in the present showing, is directly connected to the lever 60 to actuate the brakes.

By reason of the flexible connection 59, this manual operation may be accomplished without disturbing in any manner the position or method of operation of the solenoid 58.

While I have herein shown and described my invention in the best forms as now known to me, it is obvious that structural variations may be employed without departing from the spirit of the invention and I, therefore, do not desire to be limited to those precise forms beyond the limitations as may be imposed by the following claims.

I claim:

1. For a vehicle having a brake system, a driving engine and an engine control member shiftable from an initial position to positions for increasing engine output, the combination of means operated by return travel of said control member toward said initial position for setting into operation said brake system, and means rendering inoperative said first means upon a predetermined travel of said control member from said position, means automatically returning said control member to its initial position upon release, said automatic return means actuating said first means, said brake system comprising a fluid pump, a vehicle driving member, driving means between said pump and said driving member, and said first means consisting of a clutch in said driving means, and a storage tank for accumulating under pressure fluid discharged from said pump, a fluid motor, controlled means for driving the motor from the tank, and means for driving the vehicle driving member from the motor.

2. For a vehicle having a brake system, a driving engine and an engine control member shiftable from an initial position to positions for increasing engine output, the combination of means operated by return travel of said control member toward said initial position for setting into operation said brake system, and means rendering inoperative said first means upon a predetermined travel of said control member from said position, means automatically returning said control member to its initial position upon release, said automatic return means actuating said first means, said brake system comprising a fluid pump, a vehicle driving member, driving means between said pump and said driving member, and said first means consisting of a clutch in said driving means, and a storage tank for accumulating under pressure fluid discharged from said pump, a fluid motor, clutch means between said fluid motor and said vehicle driving member, and means for controlling fluid flow from said tank to said motor.

3. In a vehicle having a driving engine, and an engine control member shiftable from an initial position to positions for increasing engine output; the combination of fluid pressure means; means drivingly connecting the pressure means with said engine by shifting of said control member; fluid storage means receiving the discharge of said pressure means; a fluid operated motor; means drivingly connecting said motor to said engine under predetermined relative speeds thereof; means interconnecting said motor and said storage means; and means controlling discharge of fluid from said storage means to said motor.

FRED R. WEHMEIER.